US010601608B2

(12) United States Patent
Sapir et al.

(10) Patent No.: US 10,601,608 B2
(45) Date of Patent: Mar. 24, 2020

(54) CENTRALIZED NETWORKED TOPOLOGY FOR MOTION RELATED CONTROL SYSTEM

(71) Applicants: AGITO MOTION SYSTEMS LTD, Rishon le-zion (IL); AKRIBIS SYSTEMS PTE LTD, Singapore (SG)

(72) Inventors: Eyal Sapir, Kfar Saba (IL); Rachel Deutsch, Kfar Saba (IL); Shee Jia Chin, Johor (MY); Yong Min Kong, Singapore (SG)

(73) Assignee: AGITO MOTION SYSTEMS LTD., Le-Zion (IL)

( * ) Notice: Subject to any disclaimer, the term of this patent is extended or adjusted under 35 U.S.C. 154(b) by 65 days.

(21) Appl. No.: 15/556,069

(22) PCT Filed: Apr. 2, 2015

(86) PCT No.: PCT/SG2015/050057
§ 371 (c)(1),
(2) Date: Sep. 6, 2017

(87) PCT Pub. No.: WO2016/159872
PCT Pub. Date: Oct. 6, 2016

(65) Prior Publication Data
US 2018/0046171 A1 Feb. 15, 2018

(51) Int. Cl.
*G05B 19/418* (2006.01)
*H04J 3/06* (2006.01)
(Continued)

(52) U.S. Cl.
CPC .......... *H04L 12/403* (2013.01); *H04J 3/0644* (2013.01); *G05B 19/414* (2013.01); *G05B 2219/31115* (2013.01); *G05D 3/00* (2013.01)

(58) Field of Classification Search
CPC ................ H02P 5/00; G05B 19/41855; G05B 2219/31115; G05B 19/414; H04J 3/0644; H04L 12/403; G05D 3/00
See application file for complete search history.

(56) References Cited

U.S. PATENT DOCUMENTS 6,998,996 B1   2/2006  Eidson
2002/0110155 A1  8/2002  Pearce et al.
(Continued)

FOREIGN PATENT DOCUMENTS

WO    2013115551 A1    8/2013

OTHER PUBLICATIONS

Written Opinion of the International Searching Authority for International Patent Application No. PCT/SG2015/050057, dated Dec. 29, 2015, 5 pages.

*Primary Examiner* — Brian D Nguyen
(74) *Attorney, Agent, or Firm* — Hauptman Ham, LLP (57) ABSTRACT

A method of arrangement of centralized network motion controller employing centralised topology having a plurality of remote units as system architecture comprising the steps of: (i) providing, using synchronised messages, all system and axes data to a centralized processing unit, wherein the data is updated down to a control sampling rate and all the data items are available from each remote unit, (ii) the centralized processing unit performing system behaviour control and multi axes profiling and motion control such as position, velocity and current, (iii) synchronized messages from the centralized processing unit are used to set the timing and to keep continuous synchronization of all units and to transfer the desired low level commands to the remote unit.

21 Claims, 4 Drawing Sheets

(51) Int. Cl.
*H04L 12/403* (2006.01)
*G05B 19/414* (2006.01)
*G05D 3/00* (2006.01)

(56) References Cited

U.S. PATENT DOCUMENTS

| | | | |
|---|---|---|---|
| 2005/0273182 A1* | 12/2005 | Pearce | H04J 3/0682 700/20 |
| 2006/0245454 A1 | 11/2006 | Balasubramanian et al. | |
| 2006/0276913 A1* | 12/2006 | Pearce | H04J 3/0682 700/20 |
| 2007/0010898 A1 | 1/2007 | Hosek et al. | |
| 2007/0205910 A1* | 9/2007 | Guite | A61B 17/06166 340/12.22 |
| 2012/0056572 A1* | 3/2012 | Bigler | H02K 5/225 318/570 |
| 2012/0148145 A1* | 6/2012 | Liu | G06K 9/209 382/154 |
| 2013/0053868 A1* | 2/2013 | Cooper | A61B 1/00087 606/130 |
| 2013/0130585 A1* | 5/2013 | Eck | A63J 7/005 446/26 |
| 2013/0144116 A1* | 6/2013 | Cooper | A61B 1/00087 600/102 |
| 2014/0172341 A1* | 6/2014 | Vandersleen | G01N 27/3273 702/89 |
| 2014/0217905 A1* | 8/2014 | Clayton | G05B 19/042 315/154 |
| 2014/0222021 A1* | 8/2014 | Diolaiti | A61B 90/37 606/130 |
| 2014/0241491 A1* | 8/2014 | Dong | A61B 6/035 378/20 |
| 2015/0020186 A1* | 1/2015 | Deutsch | H04L 29/12367 726/11 |
| 2015/0216019 A1* | 7/2015 | Verfuerth | H05B 37/0272 315/153 |

\* cited by examiner

FIG. 4

CENTRALIZED NETWORKED TOPOLOGY FOR MOTION RELATED CONTROL SYSTEM

RELATED APPLICATIONS

The present application is a National Phase of International Application Number PCT/SG2015/050057, filed Apr. 2, 2015.

FIELD OF THE INVENTION

The present pertains to motion control systems, and more particularly to methods and apparatus for the arrangement of topology, and the communications between a centralized processing unit and a plurality of remotely distributed slave peripherals.

BACKGROUND OF THE INVENTION

In prior art, many different systems for motion control have been proposed and placed into commercial use. The evolution of motion control schemes has progressed, shifting from one paradigm to another over the past few decades. Performance, reliability and cost have been the main driving factor to affect such change. Characterization for these varying systems can be placed into three categories.

Figure 1:
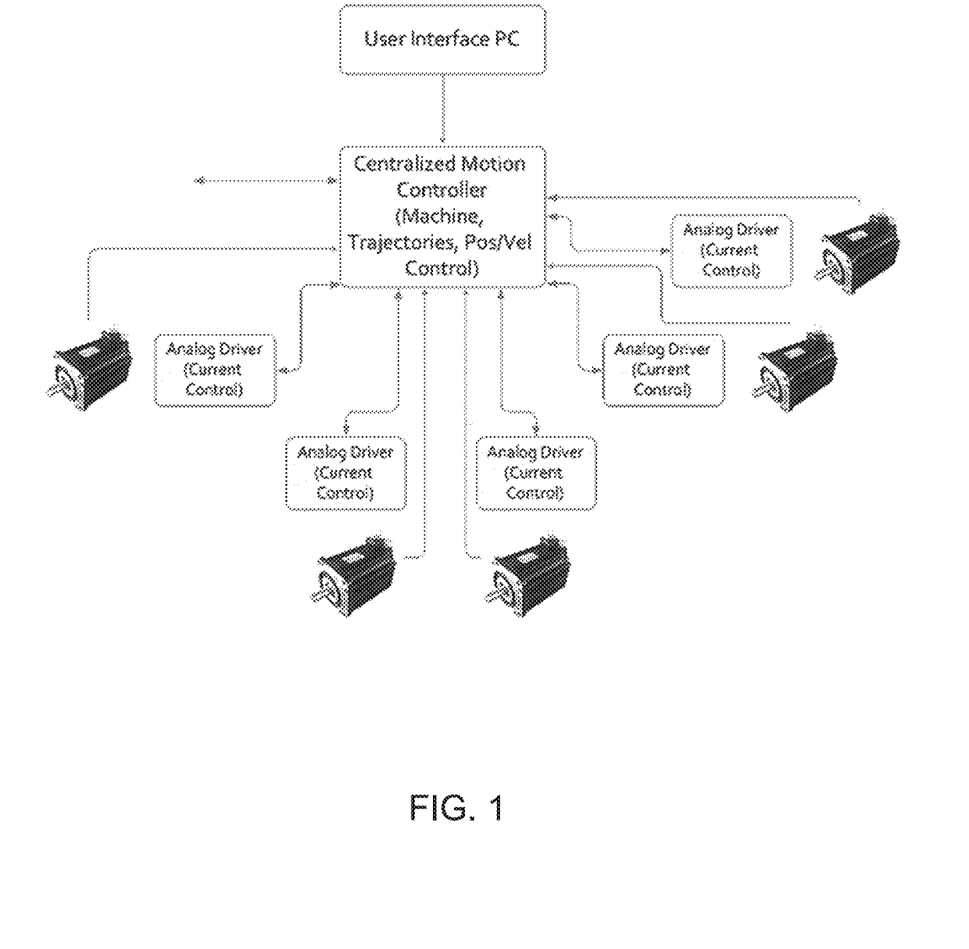
FIG. 1 is a depiction of the system flow of a conventional centralized based control system.

The first and the oldest paradigm proposed by prior art is the centralized motion control scheme shown in (FIG. 1). This implementation shows a distinct star topology where a central unit; also known as master controller in the context of motion control systems, is connected to a plurality of remote slave units which shall be termed axes or drives for the purpose of this context. The master controller will have visibility over the axes in terms of both position and velocity, thereby allowing for synchronization between all axes connected to the master controller. As a result, this particular implementation will maintain good control of motor and system characteristics. This is the typical method of choice for systems demanding high performance, particularly in scenarios requiring tight coordination between a plurality of moving axes. However such a system tends to be inflexible as all the system signals (feedbacks, amplifiers commands, inputs/outputs) need to be directly connected to the centralized motion controller. This presents a difficulty in terms of installation, maintenance and essentially reliability of the whole system.

Further still it should be noted that in the system discussed in prior art, the current control mechanism is a task performed by the remote slave units which consequentially results in tight coupling between the master controller and its remote slave units with respect to the overall control mechanism of the system. More specifically, that the position and velocity of each drive is digitally controlled and actuated by the master controller, with current control being typically realized by analog circuitry in the remote slave unit. This infers that from the perspective of the master controller, the current exerted on the motor (which is the direct element by which exerts force to move the motors) is not observable and therefore not controllable, and the final control is fully dependant on the remote slave units which results in a very rigid imposition on the proposed system.

Another form of centralized control methodology is via pulse and direction proposed by prior art, where the motion controller is essentially just a vehicle for calculating trajectories and communicating with each drive via pulse and direction commands. This topology is realized by having intelligent slave drives which have the capability to perform complex operation such as being able to perform position, velocity and current loop control by itself.

Implementations for this type of system are easy to install and flexible in terms of physical cabling which results in higher reliability and reduction of cost for the master controller.

However such a system must trade-off for lower performance with lower synchronicity between multiple axes for coordinated motion and lower control of drive motor behaviour. Additionally, communications between the master controller and it's plurality of connected slave units are primitive. This then results in the limitation that arises from not having the capability to fine tune or implement application specific control algorithms and the granularity of the system is thus coarser than other topologies.

Further still another system proposed by prior art is distributed control. The master controller is now realized as a form of networked device that can communicate with intelligent drives via some form of standardized communication protocol such as CANOpen or EtherCat.

Furthermore, the intelligent drives communicate with the master controller by informing all relevant information that the master controller has requested for during each communication cycle, for example, position, velocity, velocity command, current, current command etc. The master controller has the option to offer supervisory control whereby informing the slave unit on how to behave and assuming that the slave unit shall be able to perform the relevant task, or by explicitly controlling the slave unit in a limited way dictated by the duration of each communication cycle.

The topology of this architecture is via a daisy chain network. The network controller will be connected to one slave drive/module and each subsequent slave drive/module will be chained or connected one after another for example; Master to Slave A, Slave A to Slave B, Slave B to Slave C and so on.

This proposition presents a solution that allows more flexibility, a higher number of axes that can be connected, and a simplified cabling layout. However this solution suffer drawbacks as a result of poor performance with respect to being able to coordinate with multiple axis due to the bottleneck from the communication cycle time which is an inherent nature of the communication protocol between master and slave unit. Additionally this communication cycle may increase with a corresponding increase in the number of slave units connected to the system.

Due to the increased complexity and intelligence of the slave unit, the additional cost involved for implementation of such a system will be compounded. It also becomes very difficult or even impossible to perform tasks that require capturing or triggering of signals from the perspective of a multi-axis operation, with reliability or accuracy high enough that would be suitable for industrial or commercial applications.

Each of these existing three topologies has its own advantages and disadvantages when factors are considered in terms of performance, simplicity, reliability, manufacturability, flexibility, safety and cost.

Still further, this has not limited the merging of core concepts of these three main paradigms into some form of hybrid architecture as seen in prior art. Of such proposed prior art, one notable hybrid is a centralized motion control using ring or daisy chain topology as seen in the SyngNet architecture.

The position and velocity control is performed by the central controller while the current control is handled by its slave drives. At the same time, the central controller is also a networked device sending information of the current command to the slave nodes via digital information and feedback information about position and velocity is communicated back to the central controller in the same way from the slave drive.

The resulting topology borrows the very fast response of the centralized motion control topology, allowing for very high synchronicity between a plurality of drives and at the same time the complexity of wires is significantly reduced as the feedback of the drives in terms of position, velocity, input/outputs are sent in the form of digital communication as compared with a plurality of cables.

However this system must trade off with significantly increased difficulty and obstacles to implementing a robust and reliable system due to intrinsic complexity of achieving synchronicity between all drives when there is severe dependency between each drive because each is connected to each other in a daisy chain manner.

In view of the foregoing, the object of the proposed invention is to provide improved methods and apparatus for the arrangement of topology, and the communications between a centralized master unit and its' remotely distributed slave peripherals. The suggested solution retains all of the advantages of the existing methods, and eliminates most of their disadvantages, resulting with higher performance, higher reliability and lower production cost.

SUMMARY OF THE INVENTION

The foregoing are among the objects attained by the invention, utilizing centralized topology as the backbone of the system architecture. This implementation conveys information between master and slave unit or a plurality of slave units by using a form of digital communications protocol.

More particularly, aspects discussed from distributed control where digital messages are utilized to relay information from the remote units back to the master controller. The communication protocol presented in the proposed solution is a proprietary based serial, half duplex communication designed by Akribis-Agito.

The proposed solution presents a novel approach whereby flexibility arises in the form of simple and reliable remote units connected to the master controller using standardized and economically viable cables for relaying digital information via a communications protocol, enabling the system to reach a very high data transfer rate.

Another aspect of the communication protocol is in the implementation of error detection and correction algorithms which will not only allow communications to transfer at very high data rate, but also guarantee the reliability of the transferred data. By encoding the transferred information with corrective measures, this form of communication will allow for a much higher degree of tolerance with respect to noise.

Further still, the topology of the proposed invention will be in a star layout; master controller is connected to the slave unit or a plurality of slave units individually. The present invention provides concept of consolidating all calculations as well as having full visibility on all the states of each remote unit to the master controller; furthermore this results in more cohesion from an architectural standpoint.

By decoupling this fundamental operation present in this invention, the present invention reduces the dependency of the type of slave unit connected to the master controller, which allows for ease of future expansion and compatibility with a plurality of generic devices. These characteristics are inherently desirable in any system and therefore suitable improvement to benefit the system greatly.

Still further, by consolidating the complexity and computationally intensive operations to the master controller, the cost of the overall system is thoroughly reduced and becomes particularly economical for systems requiring a high number of axes demanding for tight coordination and synchronicity.

Yet still further, the object of the present invention is to simplify the complexity of the slave unit down to the operation of just being a power amplifier and basic operations achievable with some digital logic implemented using CPLD (or any other logic device) and capability to communicate information between the slave and a master.

That all feedback information collected by the slave unit (Position Feedback, Current sensing, Inputs/Outputs, temperature and so forth) will be sent back to the central controller at a high transfer rate, and a corresponding low level commands will be sent from the central controller to the remote units to drive the corresponding motors or discrete/analog Outputs.

The foregoing and other aspects of the invention are evident in the drawings and in the descriptions that follow.

BRIEF DESCRIPTION OF THE DRAWINGS

The drawings described herein are for illustration purposes only and are not intended to limit the scope of the present disclosure in any way.

DETAILED DESCRIPTION OF THE PREFERRED EMBODIMENT

The following description is merely exemplary in nature and is not intended to limit the present disclosure, application, or uses. It should be understood that throughout the drawings, corresponding reference numerals indicate like or corresponding parts and features.

FIG. 1 shows the system flow of a conventional centralized based control system which has visibility over all axes (motors) in terms of position and velocity, whereby allowing for synchronicity.

Figure 2:
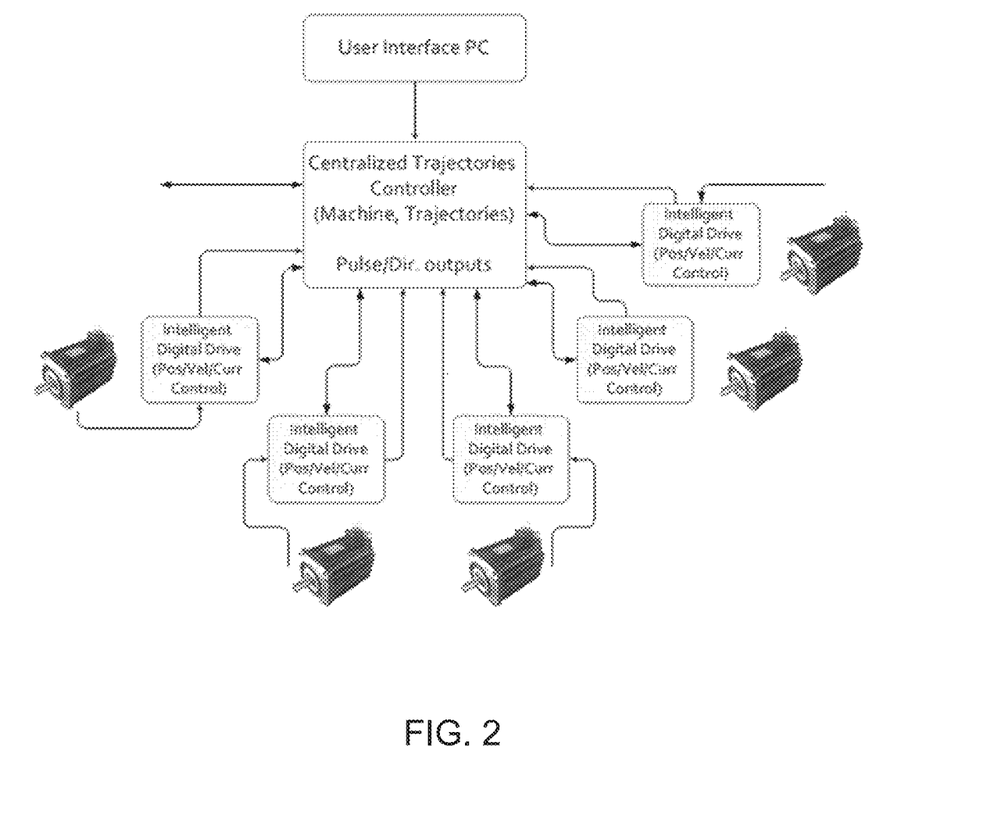
FIG. 2 is a depiction of a conventional centralized control using pulse and direction.

FIG. 2 shows a conventional centralized control methodology via pulse and directions, wherein the motion controller is calculating trajectories and communicating with each drive via pulse and direction commands.

Figure 3:
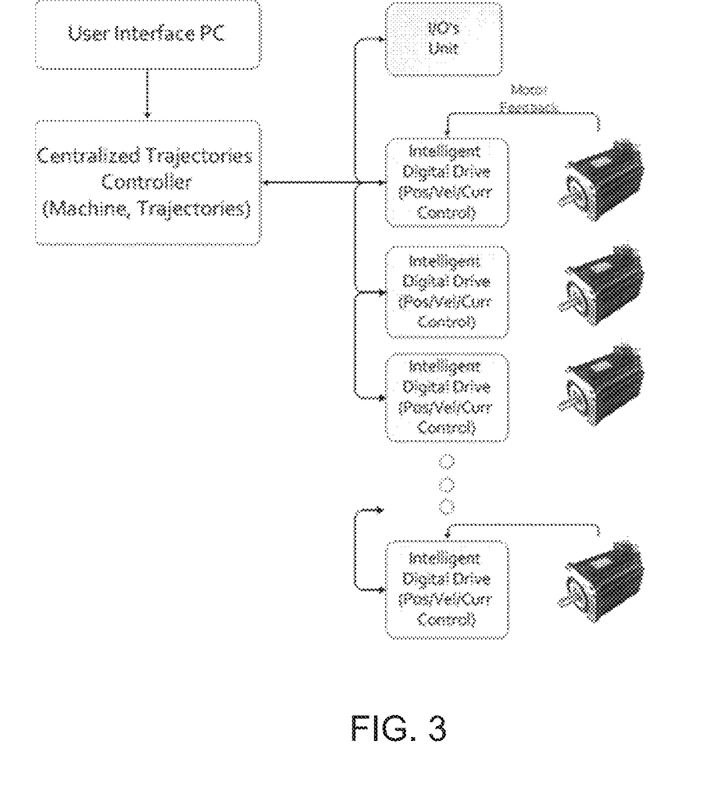
FIG. 3 is a depiction of a conventional distributed control system.

FIG. 3 shows a conventional network controlled, known as distributed control that can communicate with intelligent drives via some form of standardized communication protocol such as CANOpen or EtherCat.

A centralized networked topology for motion control systems according to the present invention is disclosed. The topology operates at higher performance, lower cost, better coordination, synchronization, reduced cabling/connectivity complexity and increased overall system reliability. The control network scheme has been arranged in such a way that bandwidth, wherein a plurality of slave units connected to the master unit, are not shared, and therefore the system performance is not degraded as a function of the increased number of slave units. The approach is generic and not limited to rotary, linear and ball screw motors as long as the communication between master and slave unit conforms to the communication standard, methodology and network topology as described herein this patent.

A method for the control of a distributed motion control system disclosed herein involves centralizing the discrete controllers by incorporating them into a centralized controller. In other words, discrete controllers originally built in the individual distributed control/power units are replaced by a centralized controller, leaving the remote units as power units only, with simple electronic circuits to interface their local sensors, inputs/outputs, as well as to communicate with the centralized computer.

Figure 4:
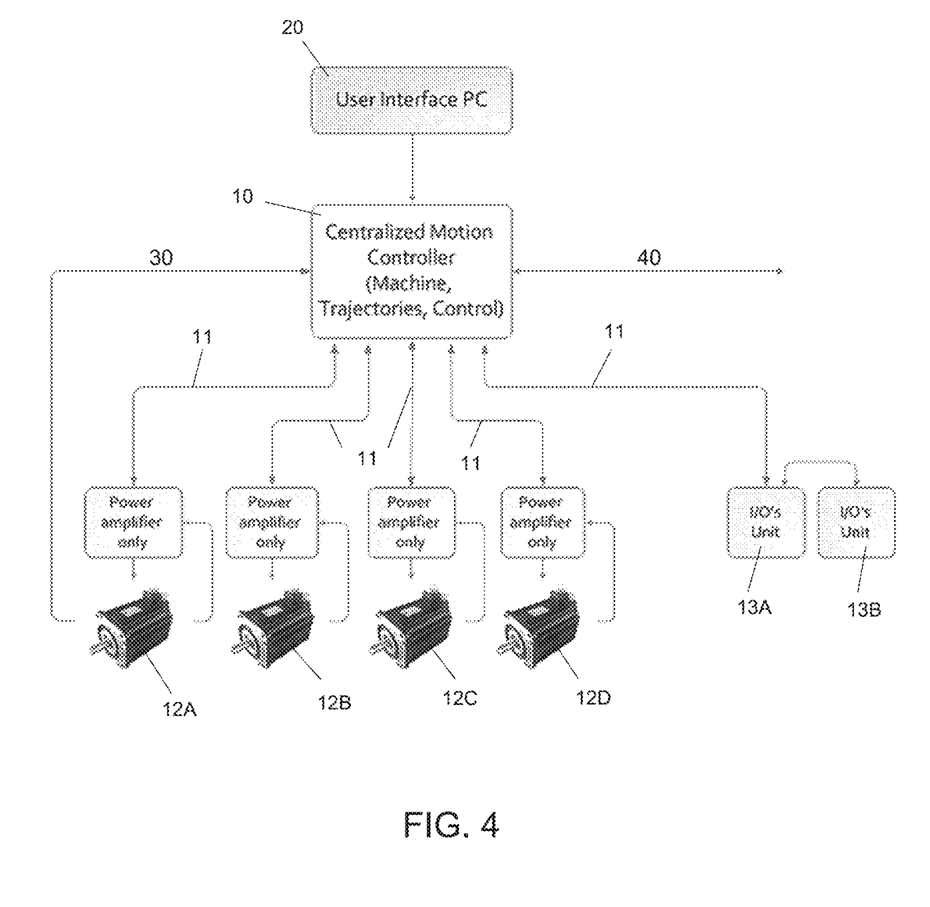
FIG. 4 is a centralized network control in accordance with the present invention.

As shown in FIG. 4, there is shown a centralized network control system comprising a master controller 10, a plurality of remote power/servo amplifiers 12A, 12B, 12C, 12D, a plurality of remote I/O units 13A, 13B, and a plurality of centralized communication links (11), each connecting the master controller 10 to a given remote unit (12A-12D, 13A-13B) (shown on FIG. 4). The control system also includes an optional user interface PC 20. In accordance with the present invention, there is option for direct connection of selected feedbacks (30) and I/O's (40) directly to the master controller 10, to support special features that require very fast responses. In some conditions, two or more remote units (for example 13A, 13B) can be chained to reduce the number of connections to the master controller 10.

In the preferred embodiment of the present invention, the remote unit 12A-12D is used just to provide the interfaces to remote systems such as motors, inputs, outputs etc. and has no need for an embedded processing unit such as CPU or DSP. Only a small board with relatively simple logic circuits is used to implement the centralized communication link, and interfaces to the remote unit's feedbacks and inputs/outputs. In the present invention, the remote unit 12A-12D, 13A, 13B as compared to conventional distributed system unit, is much simpler and cheaper.

The centralized communication (herein known as Central-I links) between the remote units (12A-12D, 13A-13B) and the centralized master controller 10 is a digital serial communication, but basically it is a 1:1 communication. In other words, all the remote units are communicating in parallel and independently (with each other) with the master controller 10. The communication is bi-directional and can be, half-duplex or full duplex. The communication between the remote units and the controllers 10 runs in a timely manner bursts, with each burst having a specific task and timing, that is used to transfer information and at the same time to synchronize all units to the master controller 10 and therefore also between themselves.

While high frequency data bursts is the method for sending messages between the master unit and each remote unit over the Central-I links, the links also operate, mainly after power on and in case of fault recovery, at lower frequencies, including DC, to transfer information (such as: reset request) that should be of higher priority comparing to the operational communication messages.

As synchronization may depend on the length of the communication cable, this invention includes a built-in feature for the measurement of the propagation delay of the cable for each remote unit and accordingly configuration of each remote unit to adjust for this timing offset, as small as it is. The remote unit will adjust its timing events (sampling of feedbacks, PWM counters, etc.) so that all the remote units will act in full synchronization even if each unit has a different length cable.

In the preferred embodiment, there are two types of communication messages over the centralized control network from the master controller 10 to each remote unit (although more types of messages can be added). The first type is synchronized messages and the second type is offline messages. The first type is used to deliver information (mainly: commands, like PWM command and outputs commands) from the master controller 10 to the remote unit 12A-12D (and 13A-13B), and at the same time to synchronize the remote unit to the master controller 10 and the second type is used just to deliver information (mainly: configuration) from the master controller 10 to the remote unit.

Similarly, two types of messages exist from the remote unit to the master controller 10. Each is a respond to a communication message from the master controller. The first is synchronized (mainly: feedbacks and inputs data) and the second is offline (mainly: configuration data).

The synchronized messages have strict timing within the control cycle of the master controller 10 and are executed at each control cycle.

The master-to-remote off line message is generally sent to configure the remote unit, typically (but not limited to) immediately after the power is switched ON. The master-to-remote configuration message has no specific timing requirements. The remote-to-master offline message is sent only as an immediate reply to the master-to-remote offline message and is used to acknowledge the received message and to report requested data.

In accordance with the preferred embodiment of the present invention, the centralized control network protocol is defined to provide the strict needs of a high performance motion control system. The synchronized messages will be as short as possible to minimize delays in the control loop. The synchronized master-to-remote message is generated to all the units in parallel, with accuracy down to few nano seconds, to ensure optimal synchronization of all units in the system. A plurality of safety features are integrated within the protocol to avoid any false operation of the remote units, such as multiple CRC, Error Detection units.

The networking of the present invention is implemented at a much lower layer of the control system and is operated at a minimal protocol, keeping the number of bits per message minimal, but yet enabling the master controller 10 to observe, in real-time, all the data about the system. The system also runs in parallel and thus achieves a total very high transfer rate without any special hardware and/or costs. The transmission and receiving of the data streams are fully handled by programmable Logic Devices at both sides. Stable and widely used base of LVDS (BLVDS) physical layer technology is one of the options to be used, or any other physical layer that can provide reliable communication over long cables and frequencies of 5 to 50 MHz. The LVDS technology is used today for very high frequencies, and here there is no need for more than 50 MHZ, and even less.

The centralized controller of the present invention provides all machines and axes data on one CPU board, and the data is updated down to the control sampling rate, wherein all these data items are available from reach of the remote units. The centralized controller 10 performs machine behaviour and multi axes motions and control, such as position, velocity and current.

The centralized network controller 10 is high multi-axis and control trajectory performance and is easy to implement axis dependency algorithm. The controller 10 is also easy to support for complex 3D error mapping and for spatial Lock/Event and other complex feedback functions, and easy to implement machine logic, as all relevant data is available at all times. The power units or the I/O 13A, 13B units are remote and flexible and is completely transparent to the controller 10 and to the user/machine.

The safety and fault at one axis has no effect on the other axes, and the controller 10 and remote units 12A-12D (and 13A-13B) are synchronized to a few nano-seconds.

The suggested topology and communication method, provides, as built-in characteristics, without the need for complex methods (such as use by EtherCat), overall system synchronization (down to few nano seconds), independency between the axes in case of fault in one axis and immediate detection and response in case of such fault, both at the faulted axis level and at the system level.

The suggested topology includes an optional scheme of isolating the Central-I link from the remote unit (which may be a high power "noisy" switching servo amplifier), basing on power to be supplied to the remote unit from the master, over free wires at the Central-I link cable.

In the present invention, the number of axes is basically limited however a more powerful processing unit at the master controller 10 can be used to overcome computational power limits, and switching boards can be used to add additional communication links. In addition, the method can be nested to have layers of master units by using the same concept/technology and thus increasing the number of supported remote units.

The description herein is merely exemplary in nature and, thus, variations that do not depart from the gist of that which is described are intended to be within the scope of the teachings. Such variations are not to be regarded as a departure from the spirit and scope of the teachings.

The invention claimed is:

1. A method of arrangement of a network motion controller having a plurality of remote units as system architecture, the method comprising the steps of:
   (i) providing, using synchronized messages, all system and axes data to a processing unit at the controller, wherein the data in the processing unit is updated at each control sampling time and the data from the processing unit is sent to the remote units at each control sampling time and all data items are available from each remote unit,
   (ii) performing, by the processing unit, behaviour control and multi axes profiling and motion control including position, velocity and current, and
   (iii) using the synchronized messages from the processing unit to set timing and to keep continuous synchronization of all units and to transfer desired low level commands to the remote unit,
   wherein the network motion controller employs a centralized topology and the processing unit is a centralized processing unit, and
   wherein each of the remote units does not have an embedded processing unit, and uses only a board with logic circuits to implement a respective centralized communication link to the centralized processing unit, and interfaces to feedback and input/output signals of the remote unit.

2. The method of claim 1, wherein the low level commands include Pulse Width Modulation (PWM) commands.

3. The method of claim 1, further comprising the steps of: measuring cables propagation delay for each remote unit, and compensating for the delay by configuration of each remote unit accordingly to the cables propagation delay measured.

4. The method of claim 1, further comprising the step of: using parallel/serial communication over the centralized processing unit, by running few serial streams in parallel, to increase a communication bandwidth per given clock frequency.

5. The method of claim 1, further comprising the steps of: performing axes dependency algorithms and 3D error mapping as well as lock and events based on spatial positions.

6. The method of claim 1, further comprising the step of: embodying power supply from the controller to the remote unit.

7. The method of claim 1, further comprising the step of: configurable connection of feedbacks and/or inputs and outputs directly within the centralized processing unit, over wires that are not used for communication messages.

8. The method of claim 1, wherein a logic device is used to implement the centralized communication link, at both sides.

9. The method of claim 1, wherein a position feedback interface is implemented on the remote unit.

10. The method of claim 1, wherein communication between the remote units and the centralized processing unit is partially daisy-chained.

11. The method of claim 1, wherein all the remote units are communicating in parallel and independently with the centralized processing unit.

12. The method of claim 1, wherein communication between the remote units and the centralized processing unit is half-duplex or full-duplex and bi-directional.

13. The method of claim 1, wherein the synchronized messages are cyclic, and each burst has a specific task.

14. The method of claim 1, wherein types of messages generated by the centralized processing unit include synchronized messages and offline messages, and each remote unit also generates synchronized and offline messages to the centralized processing unit.

15. The method of claim 14, wherein the offline messages are being sent to configure the remote unit.

16. The method of claim 14, wherein the offline messages require no specific timing or effects.

17. The method of claim 14, wherein the offline message from the remote unit to the centralized processing unit is an immediate reply to the offline message from the centralized processing unit.

18. The method of claim 1, further comprising the steps of:
   safety implementation to ensure not to perform any undesired activation of the remote unit, and keeping the remote units to be fully independent of each other.

19. The method of claim 1, further comprising the steps of:
   extending the scheme of a single master connected to a plural of remote units, into a scheme at which few masters are used, connected to each other over a centralized communication link, each with own remote units thereof.

20. The method of claim 1, wherein the method is without the use of EtherCat, and the method provides overall system synchronization, independency between the axes in case of fault in one axis and immediate detection and response in case of such fault, both at a faulted axis level and at a system level.

21. A network motion control system, comprising:
a centralized processing unit;
a plurality of remote units including:
- a plurality of servo amplifiers, and
- a plurality of I/O units; and a plurality of centralized communication links each between the centralized processing unit and one of the remote units, wherein a plurality of synchronized messages from the centralized processing unit, sent over the plurality of centralized communication links, are used to set timing and to keep continuous synchronization of the servo amplifiers and I/Os units and to transfer desired Pulse Width Modulation (PWM) commands from the centralized processing unit to the servo amplifiers, and synchronized messages from each of the servo amplifiers are sent, over the respective centralized communication link, as a response to transfer all sampled data, wherein the network motion control system employs a centralized topology, and wherein each of the remote units does not have an embedded processing unit, and uses only a board with logic circuits to implement the respective centralized communication link, and interfaces to feedback and input/output signals of the remote unit.

* * * * *